(12) United States Patent
Carazo (10) Patent No.: US 7,669,341 B1
(45) Date of Patent: Mar. 2, 2010

(54) ADJUSTABLE PRISM STAND/POLE (76) Inventor: Kenneth Carazo, 1009 Greentree Ave., Metairie, LA (US) 70001

( * ) Notice: Subject to any disclaimer, the term of this patent is extended or adjusted under 35 U.S.C. 154(b) by 353 days.

(21) Appl. No.: 11/551,505

(22) Filed: Oct. 20, 2006

Related U.S. Application Data (60) Provisional application No. 60/761,545, filed on Jan. 23, 2006.

(51) Int. Cl.
G01C 15/02 (2006.01)
(52) U.S. Cl. ............... 33/293; 248/474; 248/288.31
(58) Field of Classification Search ............... 33/293, 33/295, 296, 299; 248/469, 474, 484, 122.1, 248/288.31, 288.51; 403/56, 90, 122–125
See application file for complete search history.

(56) References Cited

U.S. PATENT DOCUMENTS

| | | | | |
|---|---|---|---|---|
| 898,391 | A * | 9/1908 | Peterson | 248/343 |
| 2,465,751 | A * | 3/1949 | Robins | 248/481 |
| 3,212,740 | A * | 10/1965 | Greenberg | 248/514 |
| 3,815,892 | A * | 6/1974 | Tulk | 269/75 |
| 3,857,639 | A | 12/1974 | Mason | |
| 4,157,876 | A * | 6/1979 | DiGiulio | 403/90 |
| 4,273,461 | A * | 6/1981 | Kjellstrand et al. | 403/125 |
| 4,490,919 | A * | 1/1985 | Feist et al. | 33/290 |
| 4,527,339 | A | 7/1985 | Brunson | |
| 4,549,360 | A | 10/1985 | Allen | |
| 4,626,086 | A * | 12/1986 | Ohyama | 248/549 |
| 4,803,784 | A * | 2/1989 | Miller | 33/293 |
| 4,926,561 | A | 5/1990 | Miller | |
| 5,225,441 | A | 7/1993 | Vogel et al. | |
| 5,404,682 | A * | 4/1995 | West | 52/165 |
| 5,701,679 | A | 12/1997 | Buzikievich | |
| 6,124,935 | A | 9/2000 | Matthews | |
| 6,302,549 | B1 * | 10/2001 | Branham et al. | 359/871 |
| 6,384,902 | B1 | 5/2002 | Schneider | |

(Continued)

Primary Examiner—Korie H. Chan
(74) Attorney, Agent, or Firm—Garvey, Smith, Nehrbass & North, L.L.C.; Brett A. North (57) ABSTRACT In one embodiment is provided an adjustment mechanism wherein the surveying pole moves about a point which is located next to or adjacent the ground surface point at which the pole is being place. In one embodiment the surveying pole moves about a point which located at the ground surface. In one embodiment the surveying pole moves about a point which is located next to the ground surface, but above the ground surface. In one embodiment the surveying pole moves about a point which is located next to the ground surface, but below the ground surface. In one embodiment a tightening means is provided which is concentrically mounted around an axial line passing through the pole. In one embodiment a biasing means is operatively connected to the tightening means. In one embodiment the biasing means is a spring. In one embodiment the biasing means is a conical spring. In various embodiments the biasing means can be a spring chosen from the group consisting of helical, cylindrical, ellipitic, flat-leaf, leaf, rectangular plate, semielliptic, sprial-coiled. In one embodiment is provided at least one viewing window for the stand to be accurately placed. In one embodiment a plurality of windows are provided. In one embodiment four windows are provided which are radially spaced. In one embodiment is provided a pin is provided which can be used to accurately place the stand. In one embodiment the pin is slidingly attached to the stand and biased toward the center of rotation of the surveying pole.

14 Claims, 7 Drawing Sheets

U.S. PATENT DOCUMENTS

| | | |
|---|---|---|
| 6,462,810 B1 | 10/2002 | Muraoka et al. |
| 6,594,910 B2 | 7/2003 | Wishart |
| 6,715,377 B1 * | 4/2004 | Brouwer ...................... 74/431 |
| 2005/0128612 A1 * | 6/2005 | Ro ............................. 359/879 |

* cited by examiner

ADJUSTABLE PRISM STAND/POLE

CROSS-REFERENCE TO RELATED APPLICATIONS

Priority of U.S. Provisional Patent Application Ser. No. 60/761,545, filed Jan. 23, 2006, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

This invention relates generally to surveying equipment. Surveying equipment and particularly the support structure should be able to withstand all kinds of environmental conditions while retaining its integrity and dimensional accuracy. In many instances, the dimensional accuracy is imperative in order to obtain the correct measurements in a geographic survey. For instance, prism poles and global positioning satellite (GPS) poles should be able to retain a substantially fixed position of extension as they are moved from place to place over uneven terrain and in all kinds of weather.

Prior art prism poles generally include two or more interfitting pole sections, and support a prism or other measurement device at the top used to sight or determine positions with laser, modulated infrared, angular and/or GPS position locators or like surveying systems. The prism reflects light back to the position locator for determining the location of the prism at different locations in a survey. U.S. Pat. No. 5,255,441 explains the operation of a basic prism pole.

One of the disadvantages with prism poles is that they generally require a team of at least two people. One to hold upright the prism pole and a second to take the surveying shot (or measurement).

One embodiment of the present invention allows a single individual to position the prism pole and take the surveying shot. It accomplishes this by providing an adjustable stand for the prism which stand has multiple degrees of freedom for adjustment. With the multiple degrees of freedom the prism can always be placed so that the pole points to the center of the earth (i.e., the pole is plumb) in various topographical conditions. If the surface topography on which the stand is placed is not level, then the stand can be adjusted such that the pole will be plumb.

There is a need in the art for providing improved prism stands.

The following US Patents are incorporated herein by reference: U.S. Pat. No. 5,255,441.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in anyway from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. What is provided is an adjustable stand for a prism which stand has multiple degrees of freedom for adjustment. With the multiple degrees of freedom the prism can be placed so that the pole points to the center of the earth (i.e., the pole is plumb) when set on a grades having various topographical conditions. If the surface topography on which the stand is placed is not level, then the stand can be adjusted such that the pole will be plumb.

In one embodiment is provided an adjustment mechanism wherein the surveying pole moves about a point which is located next to or adjacent the ground surface point at which the pole is being place. In one embodiment the surveying pole moves about a point which located at the ground surface. In one embodiment the surveying pole moves about a point which is located next to the ground surface, but above the ground surface. In one embodiment the surveying pole moves about a point which is located next to the ground surface, but below the ground surface.

In one embodiment a tightening means is provided which is concentrically mounted around an axial line passing through the pole. In one embodiment a biasing means is operatively connected to the tightening means. In one embodiment the biasing means is a spring. In one embodiment the biasing means is a conical spring. In various embodiments the biasing means can be a spring chosen from the group consisting of helical, cylindrical, ellipitic, flat-leaf, leaf, rectangular plate, semielliptic, spiral-coiled.

In one embodiment is provided at least one viewing window for the stand to be accurately placed. In one embodiment a plurality of windows are provided. In one embodiment four windows are provided which are radially spaced.

In one embodiment is provided a pin which can be used to accurately place the stand. In one embodiment the pin is slidingly attached to the stand and biased toward the center of rotation of the surveying pole.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
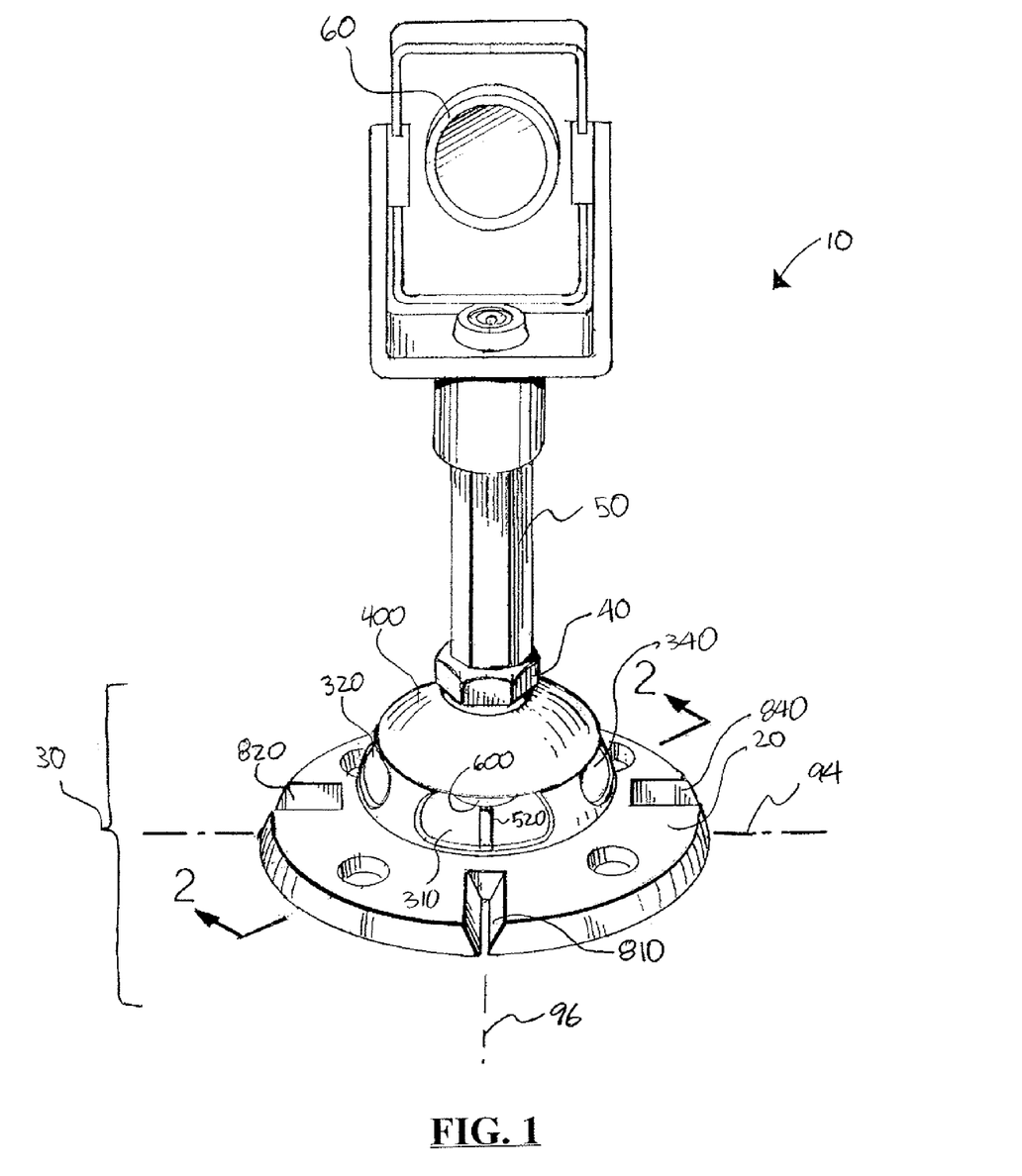
FIG. 1 is a perspective view of a preferred embodiment of an adjustable prism stand/pole.
Figure 2:
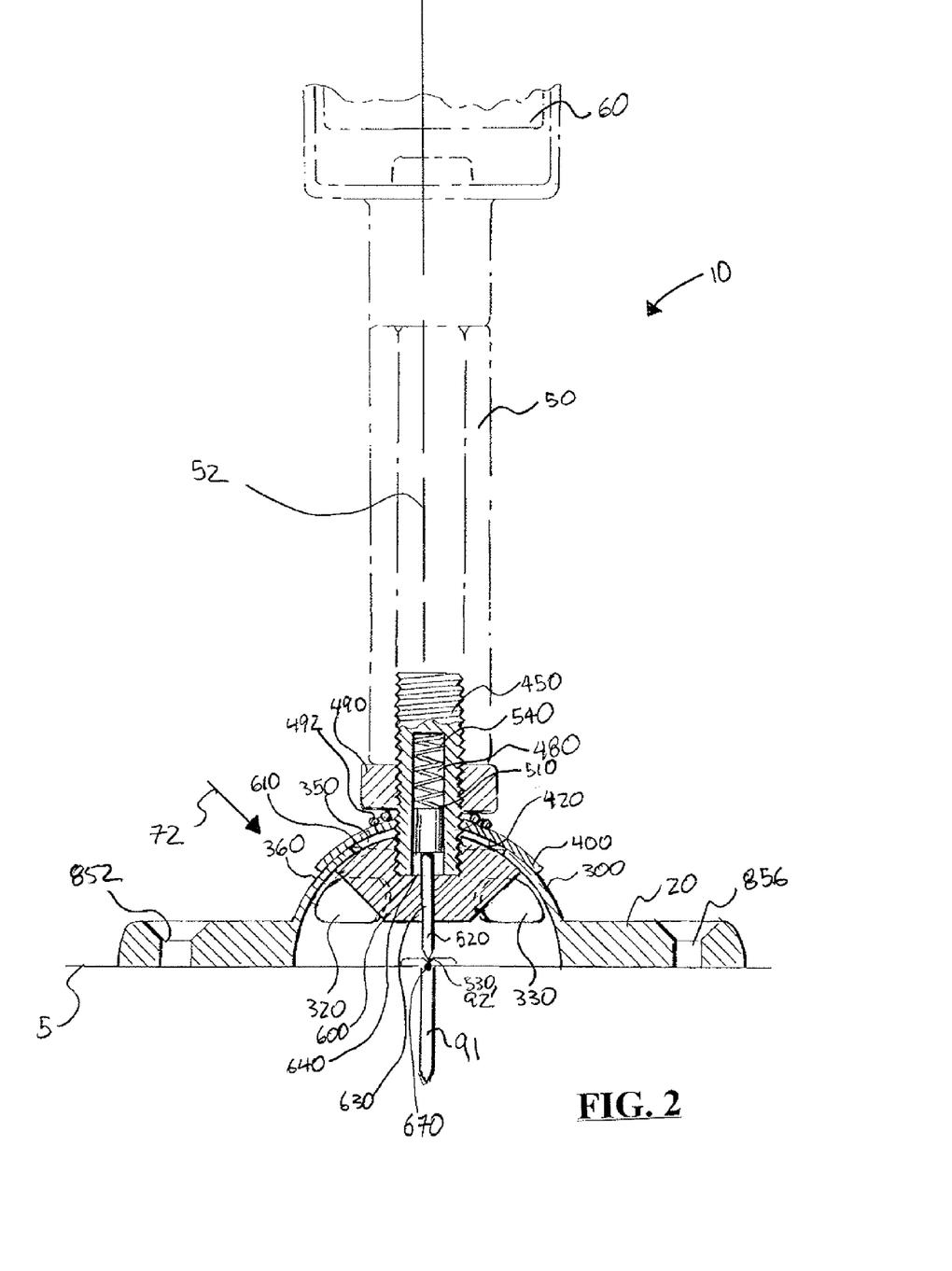
FIG. 2 is sectional view of the adjustable stand of FIG. 1 taken along the lines 2-2.
Figures 3, 3A:
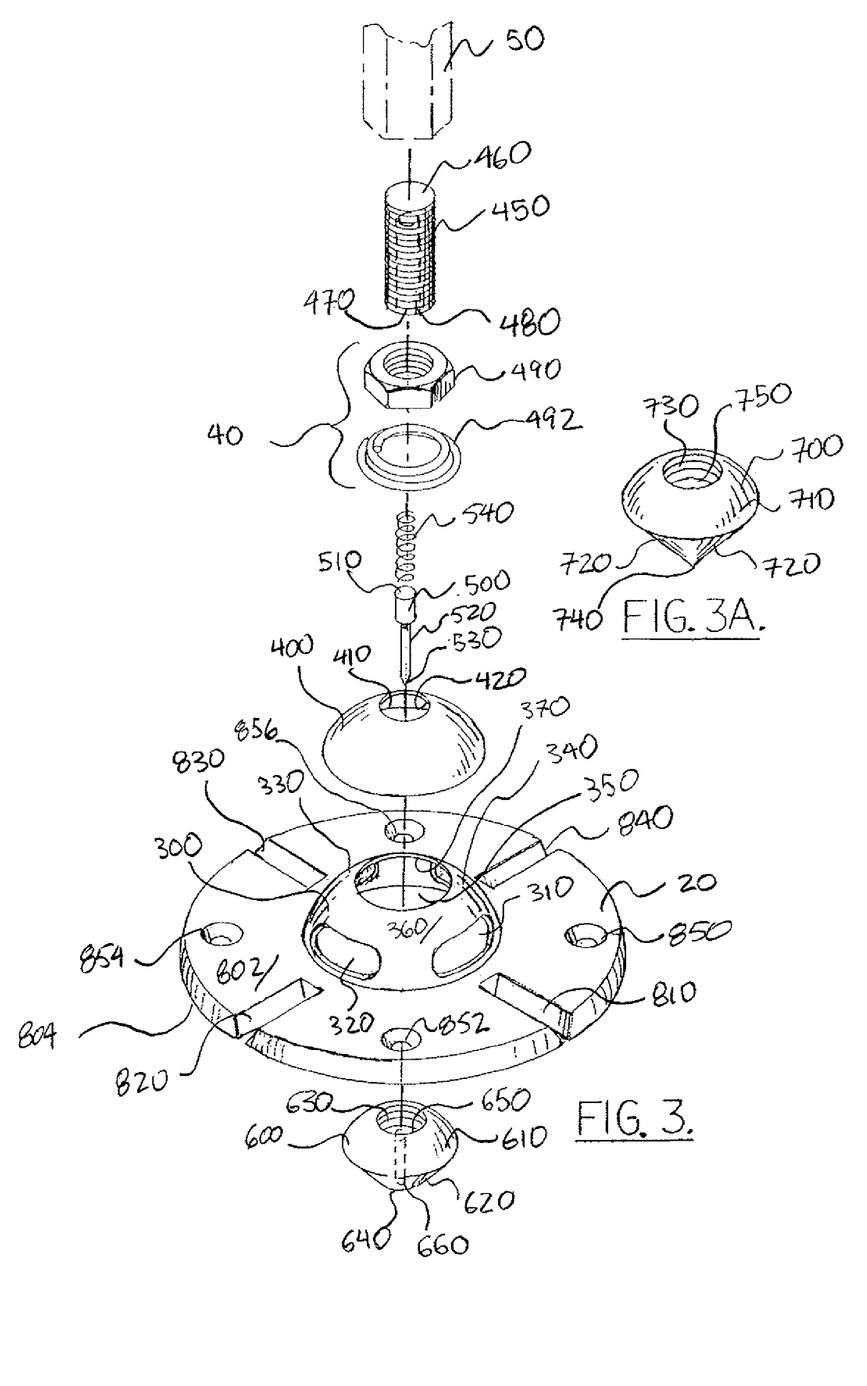
FIG. 3 is an exploded perspective view of the adjustable stand of FIG. 1.
FIG. 3A is a perspective view of an alternative retainer member.
Figure 4:
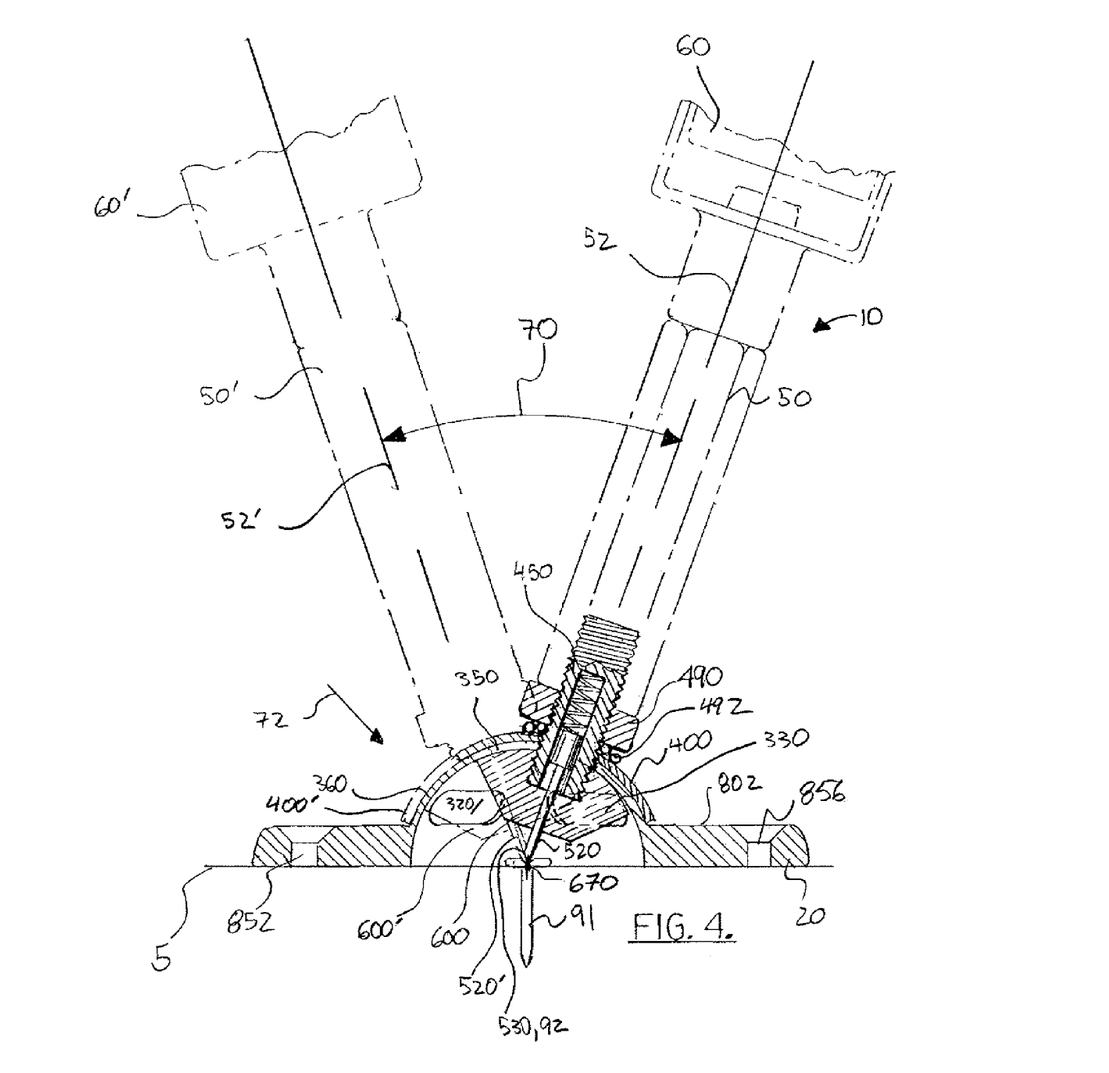
FIG. 4 is a section view of the adjustable stand of FIG. 1 showing two possible positions for adjustment.

FIG. 1 is a perspective view of a preferred embodiment of an adjustable prism stand/pole 10. FIG. 2 is sectional view of adjustable stand 10 taken along the lines 2-2. FIG. 3 is an exploded perspective view of adjustable stand 10. FIG. 4 is a section view of adjustable stand 10 showing two possible positions for adjustment.

Using adjustable stand 10 allows pole 50 (and prism 60) to be adjustable at various angles relative to base 20. At a plurality of angles base 20 is placed, pole 50 can be adjusted so it points to Earth's center (and is therefore plumb).

In one embodiment adjustable stand 10 can comprise base 20, adjustable mechanism 30, tightening means 40, pole 50, and prism 60. Adjustable mechanism 30 can have multiple degrees of freedom, two of which are schematically indicated by arrows 70 in FIG. 4. Tightening means 40 can allow one to determine the amount of frictional resistance there will be when making adjustments of pole 50, along with fixing pole 50 in a particular position relative to base 20. FIGS. 2 and 3 show one embodiment of adjustable mechanism 30. It can comprise base 20, hemispherical head 300, dome 400, tightening means 40, retainer 450, and retainer 600.

Cap or dome 400 can include opening 410 and lower surface 420. Base 20 can include hemispherical head 300. Hemispherical head 300 can include upper surface 360 with upper opening 350, and lower surface 370. Lower surface 420 of cap or dome 400 can be operatively connected to upper surface 360 of hemispherical head 300, such that dome 400 can slide relative to head 300 in various directions. An operative connection between cap or dome 400 and head 300 can be a frictional connection and can be achieved by means of retainer 600, retainer 450, and tightening means 40. In this manner cap or dome 400 can be frictionally held in place by tightening means 40 (which can include a biasing means, such as a spring 492 between nut 490 and dome 400 to maintain a relatively constant force on dome 400 even where nut 490 loosens somewhat).

Retainer 600 can comprise upper surface 610, lower surface 620, opening 630 (in upper surface), and opening 650 (between base 640 and base 650 of opening). In one embodiment alternative retainer member can be used. FIG. 3A is a perspective view of an alternative retainer member 700. Retainer 700 can comprise upper surface 710, lower surface 720, opening 750 (in upper surface), and base 740. Using alternative retainer tip at base 740 can be positioned at reference point 90, such as by indentation 92. One possible disadvantage of this embodiment is the lack of adjustment of tip at base 740 where the point of placement of stand 10 on ground 5 is not completely level.

Retainer 450 can comprise upper end 460, lower end 470, and having an opening 480 in its lower end 470. Retainer 450 can include external threads and threadably attach pole 50, tightening means 40, and retainer 600.

In one embodiment a tightening means 40 is provided which is concentrically mounted around an axial line 52 passing through pole 50 (see FIGS. 2 and 4). Tightening means 40 can have various forms. For example, nut 490 can use various means for tightening, such as an hexagonal or octagonal head. Nut 490 can also be a wing nut or an enlarged disc which can be hand tightened. Nut 490 and biasing means 492 can also be replaced by a lever mechanism frictionally locking dome or cap 400, hemispherical head 300, and retainer 600 at various angles. Such a lever mechanism can be operatively connected to retainer 450 or pole 50 and cause pole 50 to be pulled upwards in relation to retainer 600, thereby squeezing retainer 600 and dome or cap 400 against hemispherical head 300 to obtain a frictional lock. In one embodiment biasing means 492 is operatively connected to tightening means (such as nut 490). In one embodiment biasing means 492 is a spring. In one embodiment biasing means 492 is a conical spring. In various embodiments biasing means 492 can be a spring chosen from the group consisting of helical, cylindrical, ellipitic, flat-leaf, leaf, rectangular plate, semielliptic, sprial-coiled.

Figures 5, 6:
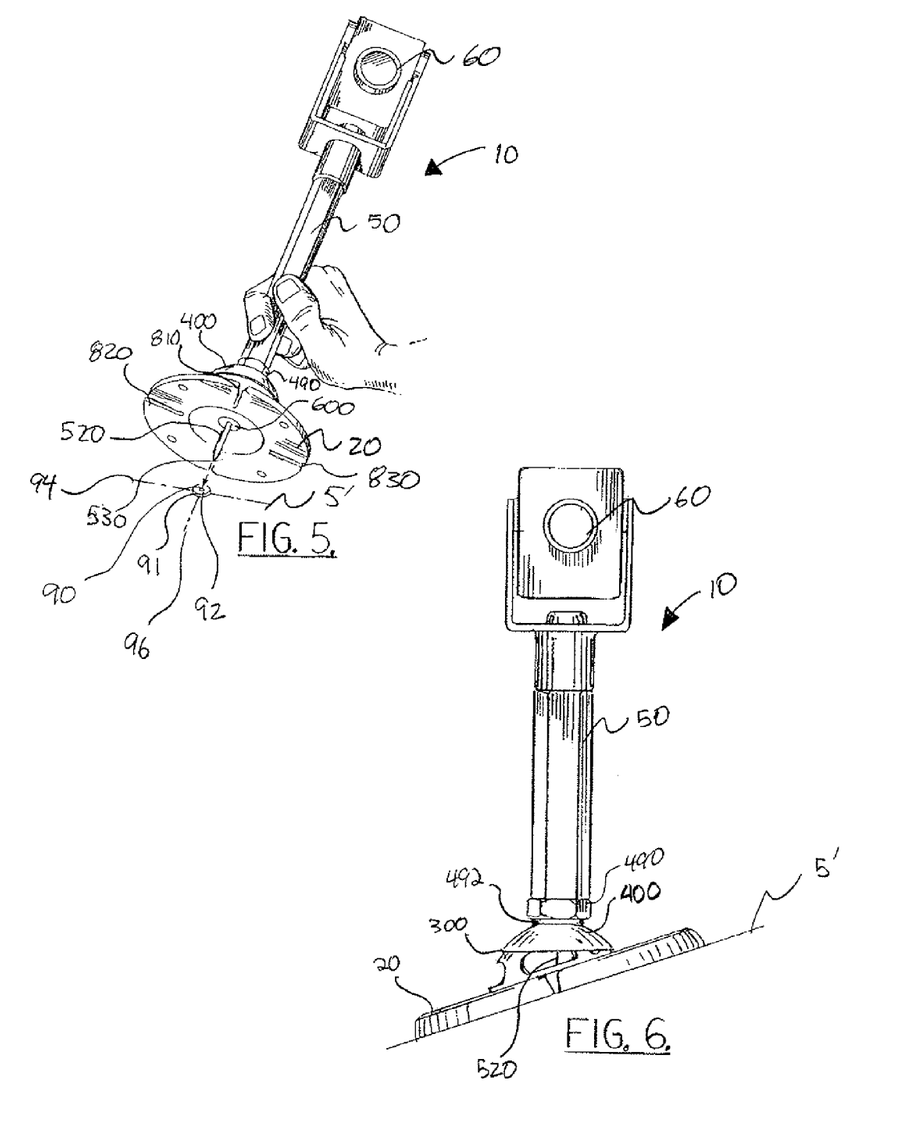
FIG. 5 is a perspective view of the adjustable stand of FIG. 1 being placed in position.
FIG. 6 is a front view of the adjustable stand of FIG. 1 after is has been placed in position on a non-level ground.

In one embodiment a plurality of reference lines can be used to accurately place prism stand 10 at a particular reference point 90 in ground 5. Perpendicular reference lines 94, 96 can intersect at reference point 90 in ground 5 (reference lines 94, 96 are shown in FIGS. 1 and 5). Reference lines 94, 96 can be painted on ground 5. Slots 810, 820, 830, and 840, can be used to line up stand 10 with reference lines 94 and 96 thereby centering base 20 over reference point 90.

In one embodiment is provided an adjustment mechanism wherein the surveying pole moves about a point 670 which is located next to or adjacent the ground 5 surface point at which the pole is being place (see FIGS. 2 and 4). In one embodiment the surveying pole moves about a point 670 which located at the ground surface. In one embodiment (not shown in the drawings) the surveying pole moves about a point which is located next to the ground surface, but above the ground surface. This embodiment can be achieved by constructing the geometry of head 300 to cause the point of rotation of pole 50 to be below ground 5. In one embodiment (not shown in the drawings) the surveying pole moves about a point which is located next to the ground surface, but below the ground surface. This embodiment can be achieved by constructing the geometry of head 300 to cause the point of rotation of pole 50 to be above ground 5.

In one embodiment is provided an indicating pin is provided which can be used to accurately place stand 10. In one embodiment the indicating pin is slidingly attached to stand 10 and biased toward the center of rotation of surveying pole 50. In one embodiment a position indicating pin 500 can be used to accurately place prism stand 10 at a particular selected reference point 90 in ground 5. Pin 500 can comprise enlarged upper end upper end 510, shaft 520, with tip at lower end 530. Pin 500 can be placed in opening 480 of retainer 450 and be slidably connected to retainer 600 through opening 660. As best shown in FIGS. 2 and 4 a biasing member 540, which can be a spring or other biasing means (such as rubber, foam, or other elastic material) can be placed in opening 480 of retainer 450 to downwardly bias shaft 520 of pin 500 through opening 660 of retainer 600. As shown in FIG. 5, tip 530 can be used to position adjustable stand 10 at a specific point on ground 5, such as by using a reference point 90 like a nail with a center indentation. Positioning can be done by both feel and viewing. By feel tip 530 can be positioned in indentation 92 of reference point 90 and placed on ground 5.

In one embodiment is provided at least one viewing window for stand 10 to be accurately placed. In one embodiment a plurality of windows are provided. In one embodiment four windows are provided which are radially spaced. By viewing, one or more of open areas 310, 320, 330, and/or 340 in hemispherical head 300 can be used to view whether tip 530 is locating in indentation 92 or reference point 90. In FIG. 1 shaft 520 (and tip 530) can be viewed from any of the open areas 310, 320, 330, and/or 340. In FIG. 6 shaft 520 (and tip 530) can be viewed from at least three of the open areas. Depending on the relative adjustment between dome or cap 400 and hemispherical head 300 one, two, or possibly three open areas may be blocked. However, at least one open area can be used to view shaft 520 (and tip 530) regardless of the adjustment of dome or cap 400 and therefore tip 530 can be used to accurately place stand 10 at a particular reference point 90 such as by indentation 92.

In one embodiment base 20 can be attached to a specific object or the ground 5. This can be accomplished by use of openings 850, 852, 854, and/or 856 (these openings are shown in FIGS. 1-4). Attached can be achieved by means of screws, nails, and/or other fasteners (such as stakes, tape, Velcro, adhesives, etc.).

Figure 7:
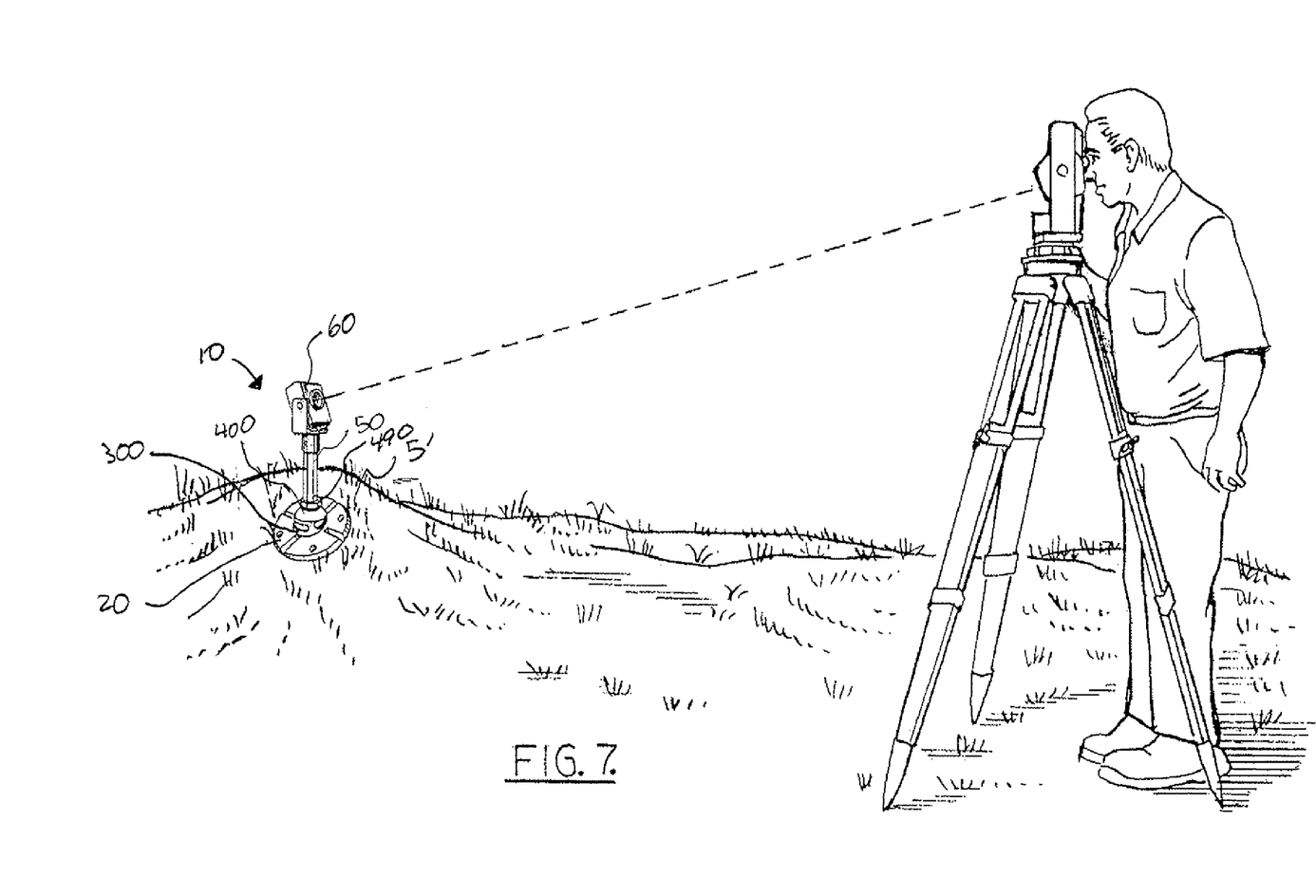
FIG. 7 is a perspective view showing a surveying shot being taken using the adjustable stand of FIG. 1.

Once stand 10 is placed at a reference point 90 and adjusted so that pole 50 is in a plumb position, a surveying shot can be taken using prism 60. This surveying shot can be taken without the need for a second team member to independently hold plumb pole 50. FIGS. 4-6 show adjustable prism stand 10 being placed on various surfaces and maintaining a plumb condition. In FIG. 4, adjustment can be made in the direction of arrows 70. FIG. 5 is a perspective view of adjustable stand 10 being placed in position at reference point 90. FIG. 6 is a front view of adjustable stand 10 after it has been placed in position on a non-level ground surface 5'. FIG. 7 is a perspective view showing a surveying shot being taken using adjustable stand 10 after being placed on non-level ground surface 5'.

Figures 8, 9:
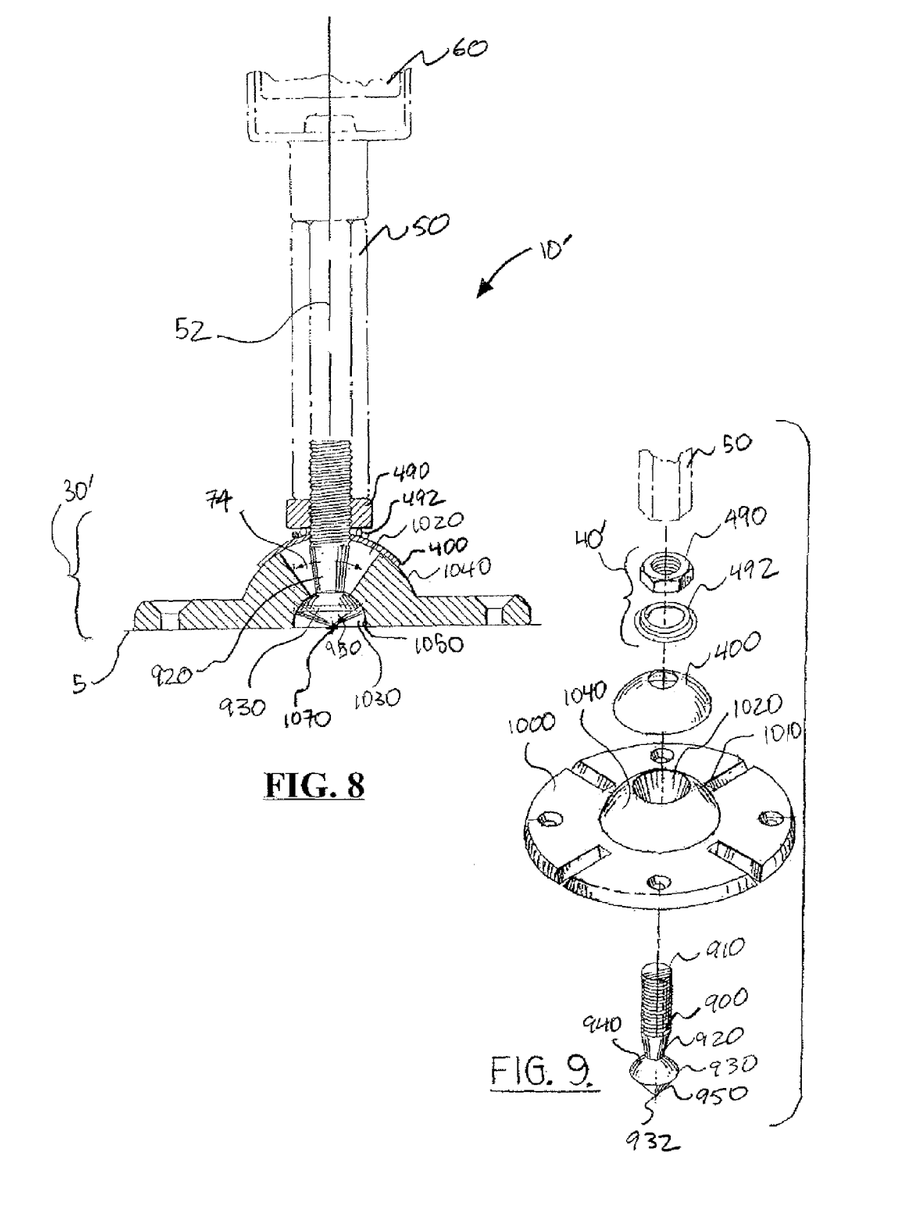
FIG. 8 is a sectional view of an alternative adjustable stand.
FIG. 9 is an exploded view of the adjustable stand of FIG. 8.

FIG. 8 is a sectional view of an alternative adjustable stand 10'. FIG. 9 is an exploded view of adjustable stand 10'. In this embodiment adjustable stand 10' can comprise base 1000, adjustable mechanism 30', tightening means 40', pole 50, and prism 60. Adjustable mechanism 30' can have multiple degrees of freedom. Tightening means 40' can allow one to determine the amount of frictional resistance there will be when making adjustments of pole 50, along with fixing pole 50 in a particular position relative to base 1000. Adjustable mechanism 30' comprise base 1000, hemispherical head 1010, dome 400, tightening means 40', and retainer 900.

Cap or dome 400 can include opening 410 and lower surface 420. Base 1000 can include hemispherical head 1010. Hemispherical head 1010 can include upper surface 1040 with upper open area 1020, and lower open area 1030 with lower surface 1050. Lower surface 420 of cap or dome 400 can be operatively connected to upper surface 1040 of hemispherical head 1010, such that dome 400 can slide relative to head 1010 in various directions. Enlarged area 930 of retainer 900 can slide relative to lower surface 1050 of lower open area 1030. An operative connection between cap or dome 400 and head 1010 can be a frictional connection and can be achieved by means of retainer 900, and tightening means 40'. In this manner cap or dome 400 can be frictionally held in place by tightening means 40' (which can include a biasing means, such as a spring 492 between nut 490 and dome 400 to maintain a relatively constant force on dome 400 even where nut 490 loosens somewhat). Movement of pole 50 in multiple directions (e.g., arrows 74) is facilitated by open areas 1020, 1030. Retainer 900 can comprise upper end 910, lower end 920, enlarged area 930, lower point 932, upper surface 940, and lower surface 950.

Stand 10 can be placed on almost any surfaces. Stand 10 can stand on its on or it can be mounted, such as by openings 850, 852, 854, and 856. For example, stand 10 can be used to survey railroad tracks, such as being placed/mounted on the ties, track, or bed. Stand 10 can also be placed/mounted on a moveable cart which itself can ride on the railroad tracks.

In one embodiment adjustable stand 10 or 10', can be used as an adjustment for items other than prisms 60. For example, adjustable stand 10 or 10' could be used to adjust lighting fixtures which have been affixed to a wall. In this embodiment, pin 500 can be removed and a longitudinal pathway can be made through pole 50, retainer 450, and retainer 600 (or through retainer 900 in stand 10') to allow electrical wires to pass through. A fixture can be mounted on top of pole 50.

The following is a list of reference numerals:

LIST FOR REFERENCE NUMERALS

| (Reference No.) | (Description) |
|---|---|
| 5 | ground |
| 10 | adjustable stand |
| 20 | base |
| 30 | adjustable mechanism |
| 40 | tightening means |
| 50 | pole |
| 52 | axial line |
| 60 | prism |
| 70 | arrows |
| 72 | arrow |
| 74 | arrows |
| 80 | arrow |
| 90 | reference point |
| 91 | nail |
| 92 | indentation |
| 94 | reference line |
| 96 | reference line |
| 300 | hemispherical head |
| 310 | open area |
| 320 | open area |
| 330 | open area |
| 340 | open area |
| 350 | upper opening |
| 360 | upper surface |
| 370 | lower surface |
| 400 | cap or dome |
| 410 | opening |
| 420 | lower surface |
| 450 | retainer |
| 460 | upper end |
| 470 | lower end |
| 480 | opening |
| 490 | nut |
| 492 | biasing means |
| 500 | pin |
| 510 | upper end |
| 520 | shaft |
| 530 | lower end |
| 540 | biasing member |
| 600 | retainer |
| 610 | upper surface |
| 620 | lower surface |
| 630 | opening |
| 640 | base |
| 650 | base of opening |
| 660 | opening |
| 670 | center of rotation |
| 700 | retainer |
| 710 | upper surface |
| 720 | lower surface |
| 740 | base |
| 730 | opening |
| 750 | base of opening |
| 802 | top |
| 804 | bottom |
| 810 | slot |

-continued

LIST FOR REFERENCE NUMERALS

| (Reference No.) | (Description) |
|---|---|
| 820 | slot |
| 830 | slot |
| 840 | slot |
| 850 | opening |
| 852 | opening |
| 854 | opening |
| 856 | opening |
| 900 | retainer |
| 910 | upper end |
| 920 | lower end |
| 930 | enlarged area |
| 932 | lower point |
| 940 | upper surface |
| 950 | lower surface |
| 1000 | base |
| 1010 | hemispherical head |
| 1020 | upper open area |
| 1030 | lower open area |
| 1040 | upper surface |
| 1050 | lower surface |
| 1070 | center of rotation |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

What is claimed is:

1. A method of adjusting a surveying prism comprising the steps of:
    (a) providing an adjustment prism stand, the stand comprising a base for placement on a ground surface, a pole, the pole being adjustable relative to the base in a spherical adjustment area with multiple degrees of freedom, and the center of the spherical adjustment area being located next to the ground surface;
    (b) connecting a prism to the stand provided in step "a";
    (c) placing the stand on a reference point and adjusting the stand so that it is plumb; and
    (d) wherein in step "a" the base includes two sets of slots, the slots in each set of slots being parallel to each other, and a line going through one set of slots makes a right angle to a line going through the other set of slots.

2. A method of adjusting a surveying prism comprising the steps of:
    (a) providing an adjustment prism stand, the stand comprising a base for placement on a ground surface, a pole, the pole being adjustable relative to the base in a spherical adjustment area with multiple degrees of freedom, and the center of the spherical adjustment area being located next to the ground surface;
    (b) connecting a prism to the stand provided in step "a";
    (c) placing the stand on a reference point and adjusting the stand so that it is plumb; and
    (d) wherein in step "a", the center of the spherical adjustment area being located at ground level.

3. The method of claim 2, wherein in step "a" the pole has a longitudinal axis, and the base has a tightening mechanism, the tightening mechanism being located around the longitudinal axis of the pole.

4. The method of claim 3, wherein in step "a" the tightening mechanism includes a retainer, and the retainer includes a retainer upper area, the retainer upper area being hemispherically shaped, and the center of rotation of the retainer is identical to the center of the spherical adjustment area.

5. The method of claim 4, wherein in step "a" an indicator is operatively connected to the retainer, the indicator pointing to the center of the spherical adjustment area.

6. The method of claim 3, wherein in step "a" an indicator is operatively connected to the pole, the indicator pointing to the center of the spherical adjustment area.

7. The method of claim 3, wherein in step "a" the base has at least one opening for viewing a reference point on which the stand is to be placed.

8. The method of claim 3, wherein in step "a" the base has a plurality of openings for viewing the reference point on which the stand is to be placed.

9. The method of claim 3, wherein in step "a", the tightening mechanism is concentrically located around the longitudinal axis of the pole.

10. The method of claim 3, wherein in step "a", the tightening mechanism includes a nut which frictionally locks the pole relative to the stand at a particular adjustment position.

11. The method of claim 3, wherein in step "a", the tightening mechanism includes a retainer, the retainer frictionally engaging the base.

12. The method of claim 2, wherein the base plate has base plate openings and further comprising fastening the base plate to an underlying support with fasteners that extend through the base plate openings.

13. A method of adjusting a surveying prism comprising the steps of:
    (a) providing an adjustment prism stand, the stand comprising a base for placement on a ground surface, a pole, the pole being adjustable relative to the base in a spherical adjustment area with multiple degrees of freedom, and the center of the spherical adjustment area being located next to the ground surface;
    (b) connecting a prism to the stand provided in step "a";
    (c) placing the stand on a reference point and adjusting the stand so that it is plumb; and
    (d) wherein the retainer includes a tip located substantially at the opposite end of the retainer as the upper area, and the retainer has a conical shape from its tip to its upper area.

14. The method of claim 13, wherein the base has base openings and further comprising fastening the base to an underlying support with fasteners that extend through the base openings.

\* \* \* \* \*